(12) United States Patent
Rohee et al.

(10) Patent No.: US 8,146,877 B2
(45) Date of Patent: Apr. 3, 2012

(54) RUNNER FOR A MOTOR VEHICLE SEAT, AND A METHOD OF MANUFACTURING SUCH A RUNNER

(75) Inventors: René Rohee, La Chapelle Biche (FR); Jean-Marie Fretel, Ger (FR)

(73) Assignee: Faurecia Sièges d'Automobile, Nanterre (FR)

( * ) Notice: Subject to any disclaimer, the term of this patent is extended or adjusted under 35 U.S.C. 154(b) by 1362 days.

(21) Appl. No.: 11/402,632

(22) Filed: Apr. 12, 2006

(65) Prior Publication Data

US 2006/0261238 A1 Nov. 23, 2006

(30) Foreign Application Priority Data

Apr. 18, 2005 (FR) ...................................... 05 03866

(51) Int. Cl.
*F16M 13/00* (2006.01)
(52) U.S. Cl. ....................... 248/429; 248/424; 296/65.13
(58) Field of Classification Search .................. 248/419, 248/420, 423, 424, 429, 430; 296/615.13, 296/615.14, 615.15; 297/473, 344.11, 344.13
See application file for complete search history.

(56) References Cited

U.S. PATENT DOCUMENTS

| | | | | |
|---|---|---|---|---|
| 5,046,698 A | * | 9/1991 | Venier | 248/430 |
| 5,048,787 A | | 9/1991 | Saitoh | |
| 6,089,521 A | * | 7/2000 | Tarusawa et al. | 248/430 |
| 6,220,642 B1 | * | 4/2001 | Ito et al. | 296/65.14 |
| 6,588,850 B2 | * | 7/2003 | Matsuo | 297/473 |
| 6,688,574 B2 | * | 2/2004 | Okazaki et al. | 248/424 |
| 6,874,746 B2 | * | 4/2005 | Ganot | 248/430 |
| 6,886,797 B2 | * | 5/2005 | McCullen et al. | 248/429 |
| 7,325,851 B2 | * | 2/2008 | Ito et al. | 296/65.13 |

FOREIGN PATENT DOCUMENTS

| | | |
|---|---|---|
| EP | 0 076 041 | 4/1983 |
| EP | 0 100 880 | 2/1984 |
| EP | 0 421 300 A2 | 4/1991 |
| EP | 0 440 880 A2 | 8/1991 |
| EP | 0 751 029 A2 | 1/1997 |
| EP | 0 781 682 A2 | 7/1997 |
| EP | 0 791 682 A1 | 8/1997 |
| EP | 0 830 970 A2 | 3/1998 |
| FR | 2 841 191 A1 | 12/2003 |
| GB | 2 219 993 A | 12/1989 |
| JP | 10-100744 | 4/1998 |
| JP | 10-100743 | 7/1998 |
| JP | 2002 104030 | 4/2002 |

OTHER PUBLICATIONS

French Preliminary Search Report FR 0503866; report dated Dec. 16, 2005.

* cited by examiner

*Primary Examiner* — Tan Le
(74) *Attorney, Agent, or Firm* — Miller, Matthias & Hull, LLP

(57) ABSTRACT

The vehicle seat runner has a first runner element receiving a vehicle seat element, and a complementary runner element fastened to the vehicle. A first fin wall and a second fin wall that are mutually parallel and that are spaced apart from each other are connected together via a base wall. Each fin wall has an inside face, the inside faces of the two fin walls facing each other. The inside faces are connected to each other in an additional connection region situated under the base wall.

25 Claims, 6 Drawing Sheets

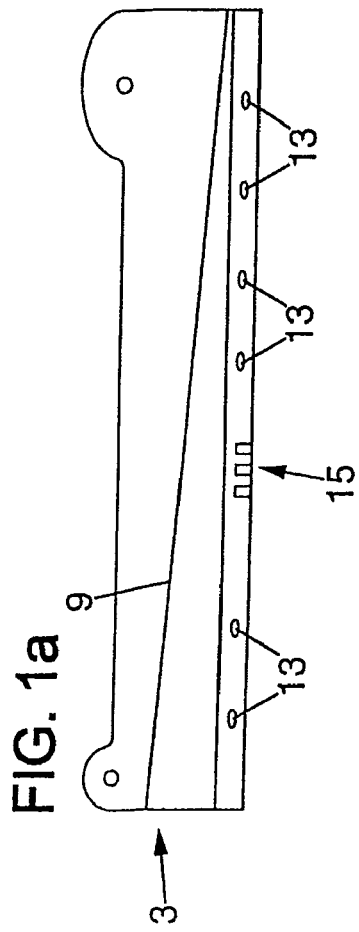
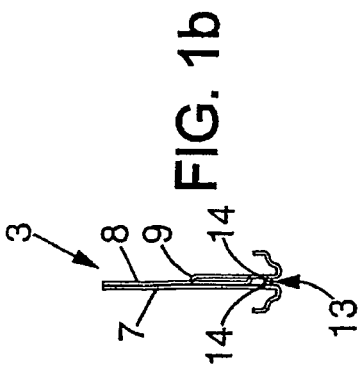
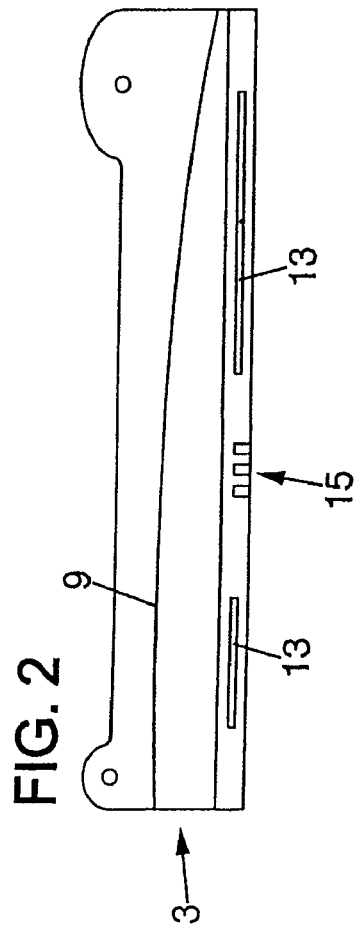
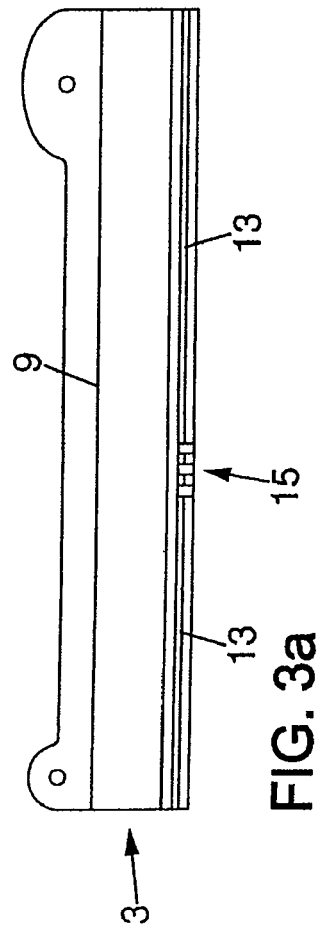
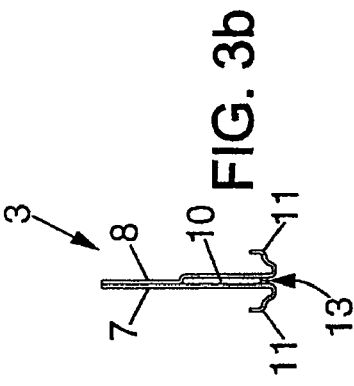

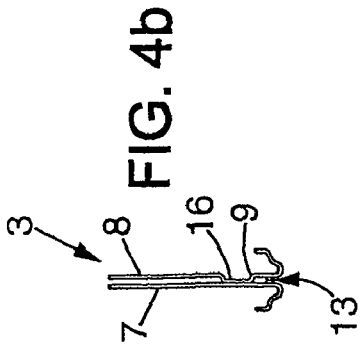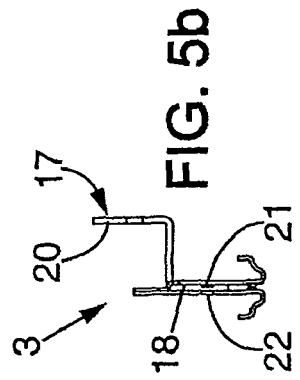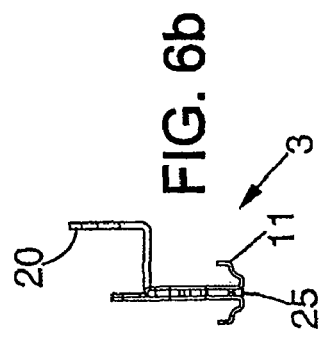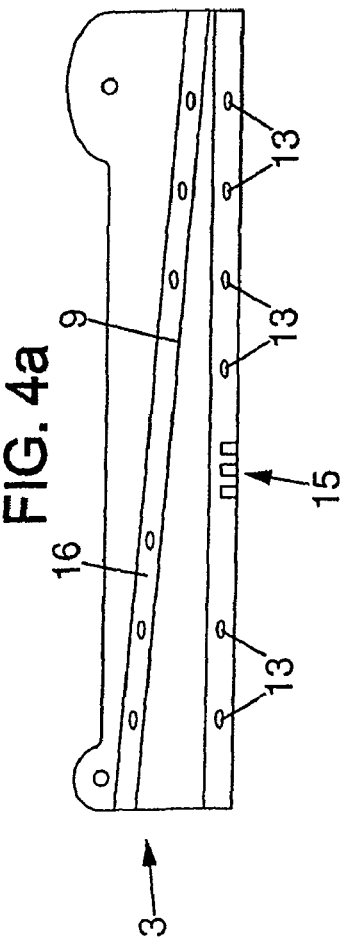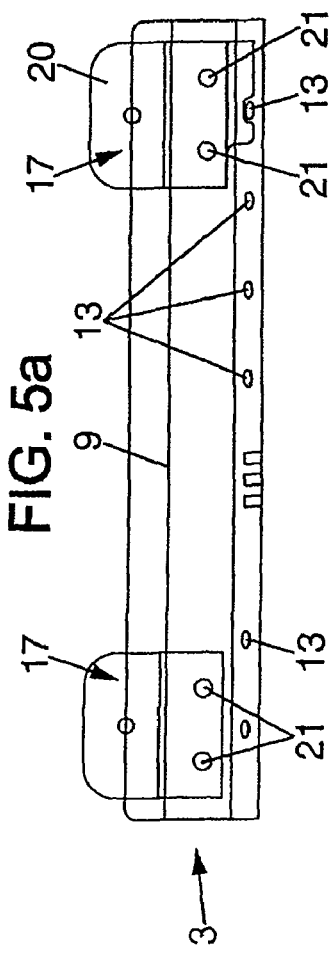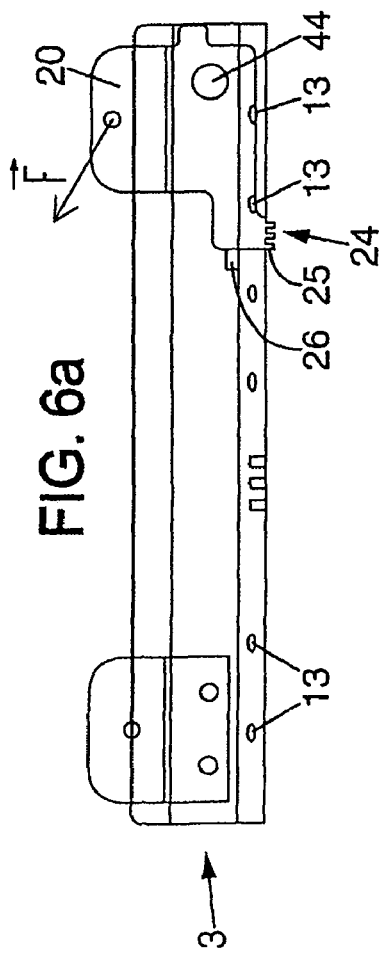

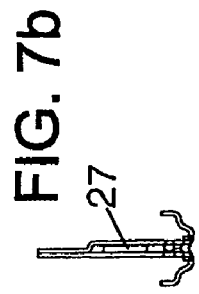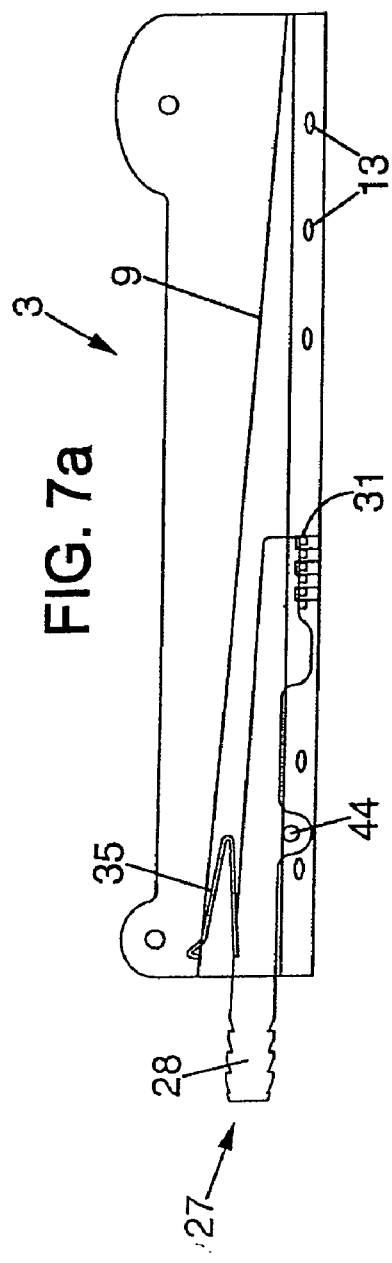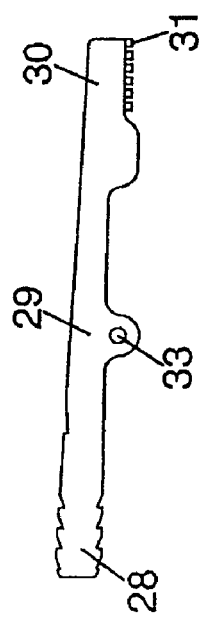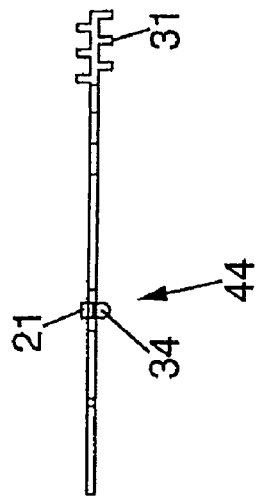

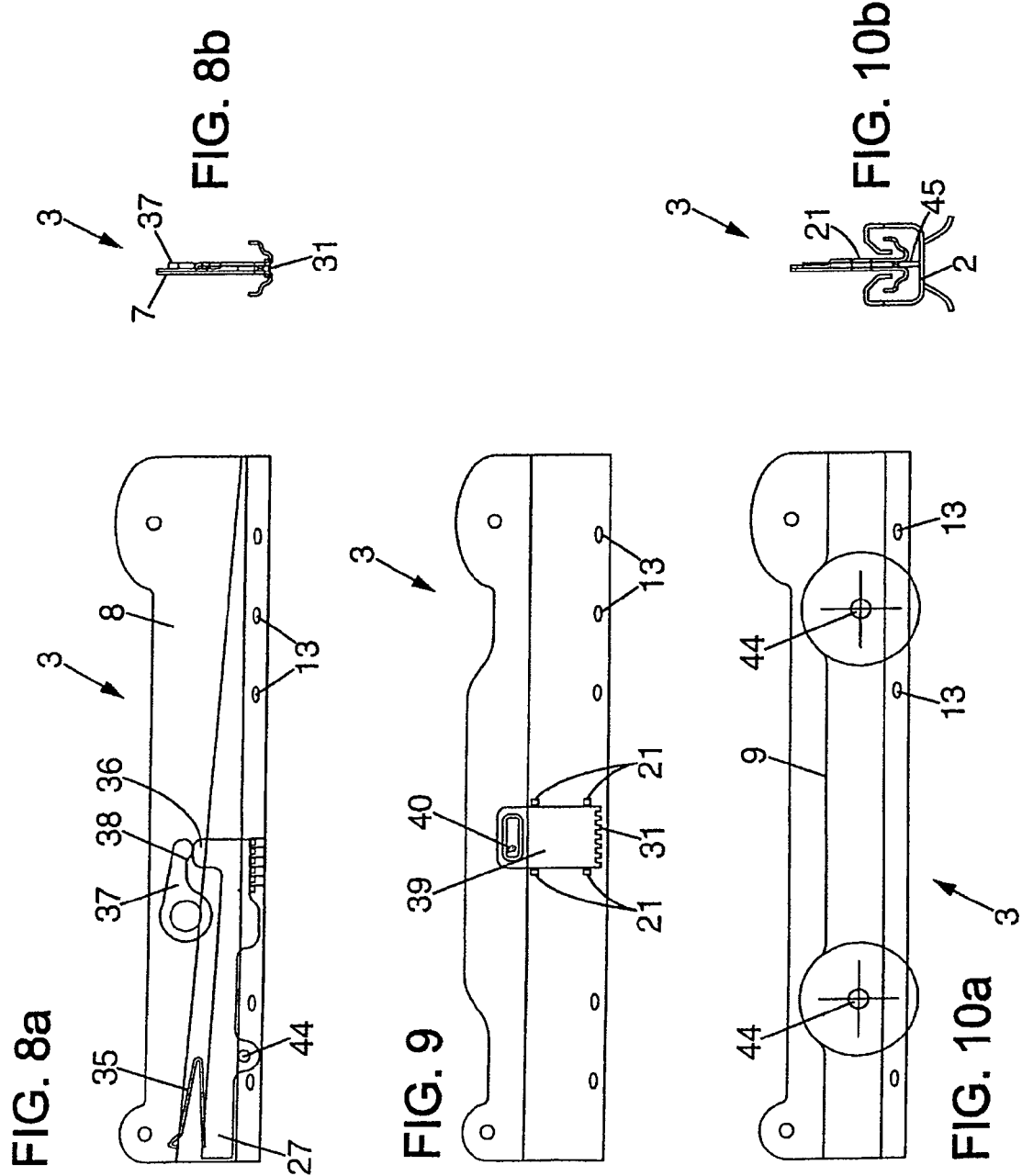

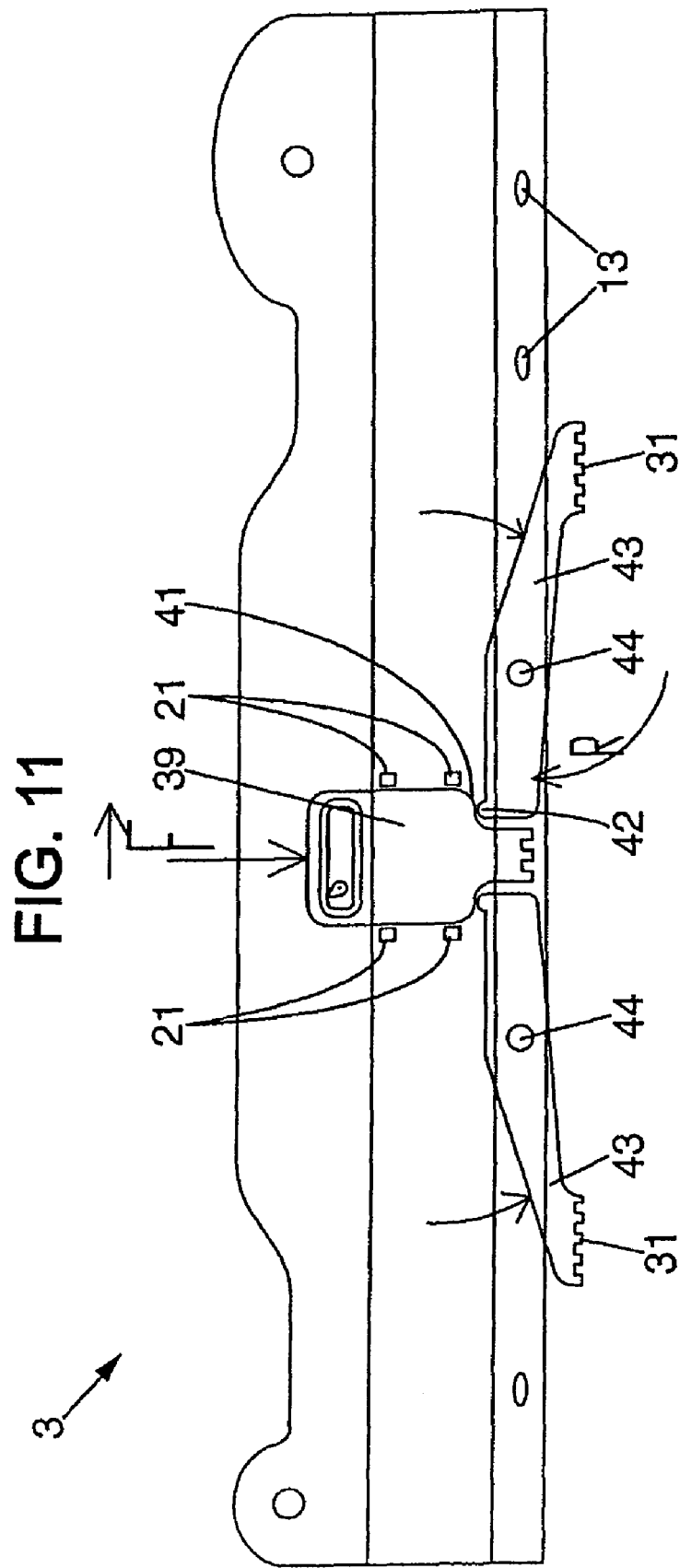

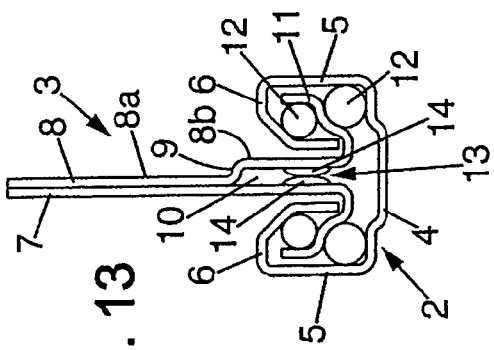
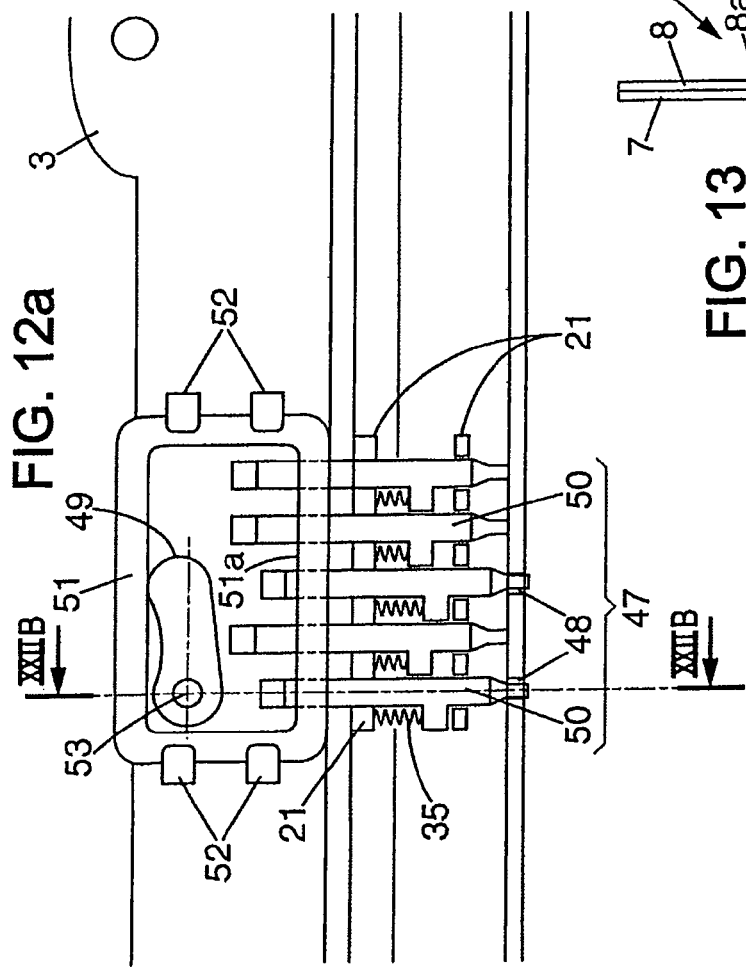
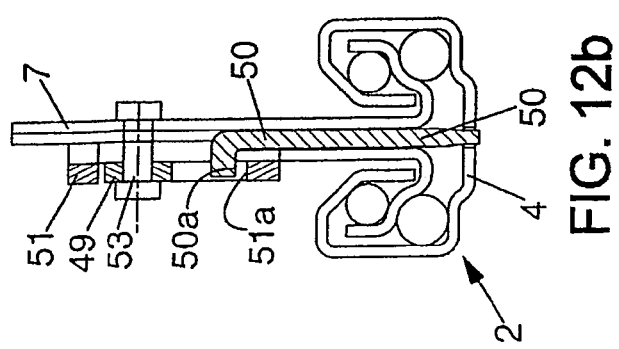

RUNNER FOR A MOTOR VEHICLE SEAT, AND A METHOD OF MANUFACTURING SUCH A RUNNER

The present invention relates to motor vehicle seat runners, and to methods of manufacturing such runners.

FIELD OF THE INVENTION

More particularly, the invention relates mainly to a vehicle seat runner having a first runner element formed to receive a vehicle seat element, and a complementary runner element designed to be fastened to the vehicle;

said first runner element extending in a longitudinal direction, and in the form of a channel-section shape, and presenting first and second side portions, co-operating with the complementary runner element to enable the first runner element to slide relative to the complementary runner element in the longitudinal direction, said first and second side portions comprising respectively a first fin wall and a second fin wall, the fin walls being substantially parallel to each other, spaced apart in a transverse direction, connected together via a base wall, and extending vertically downwards from the base wall;

each fin wall having an outside face, and an inside face opposite from the outside face, the inside face of the first fin wall and the inside face of the second fin wall facing each other.

BACKGROUND OF THE INVENTION

Document FR 2 841 191 describes an example of such a runner. The channel-section shape makes it possible to impart a good second moment of area, and good resistance to buckling to the moving runner rail which can have to support the entire weight of the seat and of the occupant of the seat. Such a runner is generally satisfactory. In order to increase the lifespan of such runners, it is desirable to increase their second moment of area. Such an increase in second moment of area could be achieved by increasing the thicknesses of the rails, which has a direct negative impact on the cost of manufacturing the runner.

OBJECTS AND SUMMARY OF THE INVENTION

A particular object of the invention is to provide a runner of the above-mentioned type with an increased second moment of area, without significantly increasing the amount of material used.

To this end, in accordance with the invention, in a runner of the type in question, said inside faces are also connected to each other in at least one additional connection region situated under the base wall.

By means of these provisions, a box-section shape is obtained at least locally, which greatly increases the second moment of area of the rail. The increase in second moment of area is such that the quantity of material necessary for making a rail that presents a second moment of area corresponding to the second moment of area of prior runner rails can even be reduced. A runner is thus obtained that offers the double advantage of presenting a greater second moment of area for a lower manufacturing cost.

In preferred embodiments of the invention, it is optionally possible, in addition, to use one or more of the following provisions:

the inside faces are connected to each other at a plurality of additional connection regions situated under the base wall, and spaced apart from one another in the longitudinal direction;

the inside faces are connected to each other at least one additional connection region extending longitudinally and situated under the base wall;

the inside faces are connected to each other at least one additional connection region extending longitudinally over the entire length of the first runner element, localized openings being provided in the additional connection region;

each fin wall extends at least between the base wall and the additional connection region, each fin wall having at least one protuberance protruding from the inside face of the fin wall, a first protuberance on the first fin wall, and a second protuberance on the second fin wall facing each other, said first and second protuberances being welded together to form said additional connection region;

said protuberance is a stamped region of the fin wall;

an internal space is defined between the two fin walls;

the base wall or one of the fin walls being provided with an access opening giving access to the internal space;

an anchor member extending through the access opening, the anchor member presenting an insertion portion extending between said fin walls and fastened to at least one fin wall, and an anchor portion adapted to receive the vehicle seat element;

the insertion portion is fastened at said additional connection region;

the anchor portion carries an anchor member for anchoring a seatbelt forming a portion of a system for restraining the occupant;

an internal space is defined between the two fin walls, and the channel-section shape has a guiding pattern adapted to guide a runner equipment mounted to move relative to the channel-section shape in the internal space;

the runner further has a runner equipment mounted to move in translation relative to the channel-section shape by co-operation with the guiding pattern;

the guiding pattern includes at least one first protrusion protruding from the inside face of a first fin wall, and the runner equipment has a contact surface coming in contact with the first protrusion and shaped to slide relative to the first protrusion while the equipment is moving relative to the channel-section shape;

the guiding pattern includes at least one second protrusion protruding from the inside face of the first fin wall, the first and second protrusions defining a direction of sliding for the equipment;

the contact surface comes in contact with the second protrusion and is shaped to slide in the direction of sliding relative to the second protrusion, so as to enable the equipment to slide relative to the channel-section shape in the direction of sliding;

the guiding pattern has at least one third protrusion protruding from the inside face of the first fin wall, the first and third protrusions being disposed on either side of the equipment in the longitudinal direction;

the contact surface comes in contact with the third protrusion and is shaped to slide relative to the third protrusion, so as to enable the equipment to slide between the first and third protrusions;

the guiding pattern has, for each protrusion provided on the first fin wall, a complementary facing protrusion protruding from the inside face of the second fin wall, the contact surface coming in contact with the complementary protrusion and being shaped to slide relative to the protrusion and to the complementary protrusion while the equipment is moving relative to the channel-section shape;

the protrusions are stamped zones of the first or of the second fin wall;

the equipment is a runner locking member mounted to move in translation relative to the channel-section shape between a locking position in which the locking member co-operates with the complementary runner element to prevent the first runner element from moving relative to the complementary runner element, and an unlocked position for allowing the first runner element to move relative to the complementary runner element;

a bias element being adapted to urge the locking member towards the locked position;

the runner further having a control member adapted to cause the locking member to move against the drive from the bias element, towards the unlocked position;

the locking member is a first locking member having at least one first latch surface adapted to co-operate with the complementary runner element in the locked position so as to prevent the first runner element from moving relative to the complementary runner element, the first locking member further having an activation surface;

the runner further having a second locking member mounted to pivot relative to the channel-section shape between a locked position and an unlocked position, the second locking member having a second latch surface adapted to co-operate with the complementary runner element in the locked position, the second latch member having a driven surface;

the first latch surface and the second latch surface being spaced apart from each other in the longitudinal direction;

the activation surface facing the driven surface so as to cause the second locking member to move from its locked position towards its unlocked position when the first locking member is subjected to being moved from its locked position towards its unlocked position;

the runner further has a runner equipment mounted to pivot relative to the channel-section shape by co-operation with the guiding pattern;

the guiding pattern comprises at least one first recess formed in the internal face of a first fin wall;

the runner equipment has a protrusion coming in contact in the first recess and shaped to turn in the first recess while the equipment is moving relative to the channel-section shape;

the inside face of the second fin wall has a second recess facing the first recess, and the runner equipment has a third recess opposite from the protrusion, the runner having a ball held captive between the second and third recesses, and adapted to turn relative to the second fin wall and/or to the equipment while the equipment is pivoting relative to the channel-section shape;

the protrusion and the third recess opposite from the protrusion are formed by stamping the equipment;

said recesses in the fin walls are formed by punching;

the equipment is a runner locking member mounted to pivot relative to the channel-section shape between a locking position in which the locking member co-operates with the complementary runner element to prevent the first runner element from moving relative to the complementary runner element, and an unlocked position for allowing the first runner element to move relative to the complementary runner element;

a bias element being adapted to urge the locking member towards the locked position; and the runner further having at least one control element adapted to cause the locking member to move, against the drive from the bias element, towards the unlocked position; and the equipment is a wheel having a rolling surface in contact with the complementary runner element, and adapted to being subjected to pivoting relative to the channel-section shape when the first runner element slides relative to the complementary runner element.

In another aspect, the invention provides a system comprising a vehicle seat element and such a runner, in which the anchor portion is fastened to the vehicle seat element.

In another aspect, the invention provides a method of manufacturing a vehicle seat runner having a first runner element formed to receive a vehicle seat element, and a complementary runner element designed to be fastened to the vehicle;

said first runner element extending in a longitudinal direction, and in the form of a channel-section shape, and presenting first and second side portions, co-operating with the complementary runner element to enable the first runner element to slide relative to the complementary runner element in the longitudinal direction, said first and second side portions comprising respectively a first fin wall and a second fin wall, the fin walls being substantially parallel to each other, spaced apart in a transverse direction, connected together via a base wall, and extending vertically downwards from the base wall;

each fin wall having an outside face, and an inside face opposite from the outside face, the inside face of the first fin wall and the inside face of the second fin wall facing each other;

said method also including a step a) consisting in connecting said inside faces to each other at least in an additional connection region situated under the base wall.

In implementations, it is optionally possible to use one or more of the following provisions:

prior to the step a), a step b) is implemented consisting in forming a protuberance on each fin wall, which protuberance protrudes from the inside face, the protuberances on the respective fin walls being in contact with each other; and during the step a), the protuberances are welded together to form the additional connection region;

during step b), the protuberances are formed by stamping;

prior to step a), at least the following steps are implemented:

c) forming at least one guiding pattern for guiding an equipment on the inside face of a fin wall; and d) placing a runner equipment between the two fin walls, which equipment is adapted to be moved relative to the fin wall between a first position and a second position by co-operation with said guiding pattern;

step c) is implemented by stamping, so as to form, as a guiding pattern, at least one protrusion on the inside face of a fin wall;

step c) is implemented by punching, so as to form, as a guiding pattern, at least one recess in the inside face of a fin wall; and prior to step a), the following steps are implemented:

e) providing an access opening in the base wall or in a fin wall;

f) inserting an anchor member through the access opening between the fin walls, which anchor member has an insertion portion extending between the fin walls, and an anchor portion adapted to receive a vehicle seat element; and during step a), the inside faces are also connected to the insertion portion of the anchor member.

BRIEF DESCRIPTION OF THE DRAWINGS

Other characteristics and advantages of the invention appear from the following description of five of its embodiments, given by way of non-limiting example, and with reference to the accompanying drawings.

In the drawings:

FIGS. 1a and 1b are respectively a side view and an end view of a moving rail of a first embodiment of a runner;

FIG. 2 is a side view, corresponding to FIG. 1a, of a moving rail of a second embodiment of a runner;

FIGS. 3a and 3b are respectively a side view and an end view, corresponding to FIGS. 1a and 1b, of a moving rail of a third embodiment of a runner;

FIGS. 4a and 4b are respectively a side view and an end view, corresponding to FIGS. 1a and 1b, of a moving rail of a fourth embodiment of a runner;

FIGS. 5a and 5b are respectively a side view and an end view, corresponding to FIGS. 1a and 1b, of a moving rail of a fifth embodiment of a runner, provided with an anchor member for anchoring a seatbelt or for coupling to the seat proper;

FIGS. 6a and 6b are respectively a side view and an end view, corresponding to FIGS. 1a and 1b, of a moving rail of the fifth embodiment of a runner, provided with a variant of the anchor member;

FIGS. 7a and 7b are respectively a side view and an end view, corresponding to FIGS. 1a and 1b, of a moving rail of the first embodiment of a runner, provided with a locking member;

FIGS. 7c and 7d are respectively a side view and a top view of the locking member of FIGS. 7a and 7b;

FIGS. 8a and 8b are respectively a side view and an end view, corresponding to FIGS. 1a and 1b, of a moving rail of the first embodiment of a runner, provided with a variant of the locking member;

FIG. 9 is a side view corresponding to FIG 1a of the moving rail of the fifth embodiment of the runner, provided with another variant locking member;

FIGS. 10a and 10b are respectively a side view and an end view, corresponding to FIGS. 1a and 1b, of the moving rail of the fifth embodiment of the runner, provided with wheels;

FIG. 11 is a side view, corresponding to FIG. 9, showing a variant of the locking member;

FIGS. 12a and 12b are fragmentary side and end views of a runner provided with an instantaneous locking member; and FIG. 13 is a diagrammatic end view of a runner.

MORE DETAILED DESCRIPTION

In the various figures, like references designate elements that are identical or similar.

The runner 1 shown in FIG. 13 comprises a stationary rail 2 designed to be connected to the floor of the vehicle so that it is constrained to move therewith, and a moving rail 3 connected to a vehicle seat element (not shown), such as a seat proper or seat back of a vehicle seat, and mounted to slide relative to the stationary rail 2, e.g. in a manner such that it is possible to adjust the longitudinal position of the vehicle seat relative to the floor of the vehicle.

In the example shown, the stationary rail 2 can, for example, be in the form of a sheet metal profile that is folded and cut out so as to be substantially of channel-section, and it comprises:

a horizontal web 4;

two vertical side flanges 5 that extend substantially perpendicularly to the web; and two reentrant troughs 6 which extend the side flanges 5 towards the inside of the runner and towards the web 4, while forming a slot between them through which the moving rail 3 projects.

The moving rail 3 comprises:

a first fin wall 7 that is substantially vertical and a second fin wall 8 that has a double bend, and that has a top portion 8a touching a top portion of the first fin wall 7, and a bottom portion 8b offset transversely relative to the top portion 8a at the double-bend zone which forms a base wall 9 for the moving member 3, so that the bottom portions of the first fin wall 7 and of the second fin wall 8 extend substantially parallel to each other but offset transversely relative to each other so as to define an internal space 10 between them.

The bottom ends of the first and second fin walls 7, 8 are connected to respective troughs 11 extending outwards and upwards between the web 4 and the reentrant trough 6 of the stationary rail 2 so as to define four raceways for balls 12 making it possible for the moving rail 3 to slide relative to the stationary rail 2 in a longitudinal direction of sliding that is normal to the plane of FIG. 13. In the bottom portions of the first and second fin walls 7, 8, each fin wall has:

an inside face facing towards the inside face of the other fin wall, and spaced apart therefrom, the two inside faces defining the internal space 10 between them; and an outside face, opposite from the inside face, and facing towards the trough 11 of the moving rail 3.

It should be noted that the geometrical shape given by way of example is merely given by way of illustration, in particular in the embodiment of two side portions, each of which has a bottom fin wall portion and a trough 11, the two fin walls being spaced apart transversely, and being interconnected by a central portion, which is the base wall 9 in this example. In particular, it is possible to make provision for both of the fin walls 7 and 8 to be fin walls having double bends.

In order to increase the second moment of area of the moving rail 3, the inside faces are connected together in an additional connection region 13 in the internal space 10. For example, a protuberance 14 forming a protrusion on the inside face of the fin wall 7, 8, is formed on each fin wall 7, 8. Two protuberances formed respectively on the first fin wall 7 and on the second fin wall 8 are formed facing each other, in contact with each other, e.g. by stamping each fin wall 7, 8. The two protuberances 14 are then connected together by welding. The resulting box-section shape, formed by the additional connection region 13, by the first fin wall 7, by the base wall 9, and by the second fin wall 8 make it possible to obtain a moving rail 3 whose second moment of area is significantly improved compared with the rail of the runner of above-mentioned Document FR 2 841 191. Therefore, it is possible to reduce the transverse distance over which the base wall 9 extends, compared with the runner of that document, to only a few millimeters, while maintaining good strength for the moving rail 3.

FIGS. 1a and 1b show a first embodiment for the runner of FIG. 13. In this example, it can be noted that the moving rail 3 has a profile that varies along its longitudinal direction, so that the height of the base wall 9 relative to the floor (not shown) varies along the longitudinal direction of the runner. A plurality of additional connection regions 13 are formed all the way along the moving rail 3, by spot welds along the rail. Said additional connection regions are always formed under the base wall 9 so as to form a plurality of box-section shapes.

As shown in FIG. 2, in a second embodiment, the additional connection regions 13 can be formed continuously, and extending longitudinally, by laser welding over a fraction of the length of the rail.

As shown in FIGS. 3a and 3b, in a third embodiment, the additional connection region 13 can be formed over the entire length of the moving rail 3, optionally with the exception of localized locking regions 15 at which it is necessary to allow a locking element to pass transversely through the bottom ends of the first and second fin walls 7, 8.

Independently of the way the additional connection region is formed, it should be noted that FIG. 3b shows a runner moving rail 3 whose base wall 9 is at a constant height.

As shown in FIGS. 4a and 4b, in a fourth embodiment, the base wall can be formed by connecting together the vertical fin wall 7 and a second fin wall 8 having a quadruple bend, having an extended contact region 16 that is welded in part or in full to the first fin wall 7.

As shown in FIGS. 5a and 5b, an anchor member or seat proper coupling member 17 can be mounted at the front of and/or at the back of the moving rail 3. In the example shown, each anchor member 17 is in the form of an angle bracket having an insertion portion 18 that is substantially vertical, a connection portion 19 that is substantially horizontal and that connects the insertion portion 18 to a fastening portion 20 which is also vertical and to which the seat proper or the back of the seat of the vehicle is fastened in conventional manner (not shown).

At the front and at the back of the moving rail 3, an access opening 23 is provided in the base wall 9 so as to give access to the internal space. The insertion portion 18 of the anchor member 17, which portion is of thickness substantially equal to the width of the internal space 10, is inserted through the access opening. For rigidly fastening the anchor member 17, it is possible, for example, to make provision for the bottom end of the insertion portion 18 to extend down to the level of the protuberances 14 and into contact therewith, so as to be welded therewith while the additional connection portion 13 is being formed.

In addition, or alternatively, one face of the insertion portion 18 can be provided with a protrusion 21 which is formed, for example, by stamping the insertion portion 18, and which thus defines a corresponding recess (not shown) in the opposite face. The inside face of the fin wall of the moving rail that is in contact with the protrusion 21 is provided with a recess, such as an opening 22, e.g. formed by punching out the fin wall. The other fin wall, facing the opening 22, is also provided with a protrusion 21, e.g. formed by stamping.

While the insertion portion 18 is being inserted through the access opening, the protrusion 21 on the insertion portion 18 is inserted into the opening 22 provided in the fin wall. They are optionally welded together. Simultaneously, the protrusion 21 formed on the other fin wall co-operates with the corresponding recess in the insertion portion 18 so as to form a retaining region for retaining the anchor member 17 on the moving rail 3.

By forming a plurality of retaining regions as described above, it is possible to guarantee that the anchor member 17 is held in position on the moving rail 3 without moving relative thereto.

As shown in FIG. 6a, the fastening portion 20 can receive a seat-mount seatbelt that can exert a considerable force F on the anchor member in the event that the vehicle crashes. In a variant of the embodiment of FIGS. 5a and 5b, it is possible to make provision for the anchor member 17 to be provided with a safety catch 24, as described below.

In this example, only one retaining region as described above with reference to FIG. 5a is provided. If traction F is exerted on the anchor member 17 by the seatbelt, said anchor member 17 might turn about the retaining system, counter-clockwise in FIG. 6a. The insertion portion 18 is provided with a toothed portion 25 extending under the additional connection regions 13 in a normal in-use position, and spaced apart from a corresponding toothed sector (e.g. openings) provided in the stationary rail 2 (not shown) which is connected to the floor. In addition, the moving rail 3 can be provided with an abutment 26 fastened in the internal space 10 and limiting the extent to which the anchor member 17 can move longitudinally relative to the moving rail 3.

When a large amount of traction F is exerted on the anchor member 17, the anchor member 17 pivoting and the toothed portion 25 meshing with the corresponding toothed sector on the stationary rail forms a latch that retains the moving rail so that it is held stationary relative to the stationary rail. In addition, the abutment 26 deforms so as to release deformation energy imparted by the crash.

FIGS. 7a and 7d show an example of a locking and unlocking mechanism for locking and unlocking the above-described runners. For example, an unlocking lever 27 is provided that has a front portion 28 designed to be connected to a control bar, an intermediate portion 29 for coupling to the moving rail 3, and a rear portion 30 provided with a toothed sector 31 whose teeth extend in the transverse direction of the lever 27. Said teeth engage in corresponding recesses (not shown) which are formed in the bottom ends of the fin walls of the moving rail, and in which they can move substantially vertically. The bottom ends of the troughs 6 of the stationary rail are also provided with corresponding recesses (not shown) so that the teeth on the unlocking lever 27 extend transversely through the recess in the moving rail and through the recess in the stationary rail that is in register in the locked position, and said teeth can be moved downwards so as to disengage from the recesses in the stationary rail in the unlocked position, so as to enable the moving rail and the stationary rail to move relative to each other. The intermediate portion 29 of the lever 27 is provided with a stamped region 32 having a protrusion 21 protruding from one of the side faces of the unlocking lever 27, and a corresponding recess 33 in the opposite face.

For mounting the unlocking lever 27 in the rail 3, a guiding pattern is formed in the moving rail 3 by forming a recess 22 in each fin wall, the two recesses being formed facing each other, e.g. by being constituted by openings formed by punching. The unlocking lever 27 is inserted into the internal space 10, e.g. from the front end of the moving rail 3, so that the stamped region 32 comes to co-operate with the opening 22 provided in one of the fin walls 7 or 8, and so that the front portion 28 of the unlocking lever 27 extends beyond the front end of the moving rail 3 for connection to a control bar. For example, it is possible to insert a ball 34 between the opening 22 formed in the other fin wall and the recess 33 provided in register in the unlocking lever 27, so as to guide the pivotal motion of the unlocking lever 27 relative to the moving rail 3.

The unlocking lever is mounted with said lever being in an unlocking position in which the moving rail 3 is free to slide relative to the stationary rail 2, and then, once mounting is complete, a bias element 35 such as, for example, a blade spring having one end in abutment against the base wall 9 and its other end in abutment against the unlocking lever 27, urges said lever towards its locked position, in which the teeth 31 mesh in the corresponding recesses in the stationary rail 2.

A user (not shown) actuating the control bar causes the unlocking lever 27 to pivot at the guiding pattern, so as to disengage the toothed sector 31 of the lever from the corresponding teeth provided in the stationary rail. It is then possible for the seat to be moved longitudinally so long as the control bar is activated. The user releasing the control bar returns the unlocking lever 27 to the locked position under drive from the bias element 35.

The pivotal mounting that is described above for mounting the unlocking lever 27 to the moving rail 3 can be used for any other type of runner equipment insertable into the internal space 10.

In a variant shown in FIGS. 8a and 8b, the unlocking lever 27 does not necessarily extend beyond the front end of the moving rail 3. In this variant, the unlocking lever 27 has an abutment surface 36 passing through an access opening 23 giving access to the internal space 10, and the unlocking system has an actuator lever 37 mounted to pivot, e.g. conventionally, on the top portion of the second fin wall 8, and having a second abutment surface 38. In the example shown, the actuator lever 37 is urged by a bias element (not shown) so that the second abutment surface 38 comes into contact with the first abutment surface 36 of the unlocking lever 27 so as to hold said unlocking lever in the locked position, against the blade spring 35. A user can impart pivot motion counterclockwise in FIG. 8a to the actuator lever 37, so as to allow the unlocking lever 27 to pivot under drive form the blade spring 35, so as to unlock the runner.

FIG. 9 shows another example of a runner locking mechanism.

In this example, a locking member 39 is inserted, at least in part, into the internal space 10 via an access opening 23 (cf. FIG. 5a). The locking member 39 has a toothed sector 31 on its bottom end, which sector extends transversely to co-operate, in the locked position, with a complementary toothed sector on the stationary rail (of the type described above, and not shown). It is urged into a locked position by a bias element of the spring type (not shown).

On either one or both of the fin walls 7 and 8, guiding patterns are provided that have as many contact surfaces as there are guiding patterns, against which contact surfaces a contact surface of the locking member 39 can bear (or come in contact) for sliding vertically relative to the moving rail 3. For example, the guiding patterns 21 are formed by stamping the fin walls 7 and/or 8 so as to form protrusions 21 that protrude from the inside faces of said fin walls. In the example shown, four protrusions are formed on each of the fin walls 7 and 8 so as to prevent the locking member 39 from moving in the longitudinal direction, because said locking member bears on either side against protrusions, and so as to allow it to slide in the vertical direction by bearing against said protrusions. An eccentric cam 40 that is controllable by an occupant of the seat makes it possible to cause the locking member 39 to move in vertical translation relative to the moving rail 3.

In a variant embodiment shown in FIG. 11, the above-described locking member 39 has, on its bottom portion, an activation surface 41 in abutment against a driven surface of 42 of an over-latch 43. The over-latch is mounted to pivot on the moving rail 3, e.g. in the same way as the unlocking lever 27 described with reference to FIG. 8a. In particular, a guiding pattern 44 is formed on each fin wall so as to enable the over-latch to move relative to the moving rail. The over-latch has a toothed sector 31 coming into engagement with openings provided in the web 4 of the stationary rail (not shown). When the cam 40 causes unlocking to take place, by forcing the locking member 39 to move downwards in translation, while being guided in translation along the protrusions 21, the activation surface 41 comes into contact with the driven surface 42 of the over-latch 43 and causes said over-latch to pivot about the guiding pattern 44 so as to move the toothed sector 31 of the over-latch 43 upwards so as to unlock the runner.

The use of two over-latches 43 that are symmetrical about the locking member 39 makes it possible to offer strong anchoring for the moving rail 3 relative to the stationary rail 2, which can be advantageous in the event of an impact.

In addition to the anchor members, the locking members, and the control members described with reference to FIGS. 6a to 9 and 11, the equipment mounted to move in the internal space 10 can also be a wheel 45 having a rolling surface 46 in contact with the web 4 of the stationary rail 2. For example, the wheel 45 is mounted to pivot relative to the. moving rail 3 in the internal space 10 in the manner explained above. Thus, the wheel 45 participates in the sliding movement of the moving rail 3 relative to the stationary rail 2 (not shown).

As shown in FIGS. 12a and 12b, the internal space 10 can also have an instantaneous latch 47. Openings 48 are provided in the web 4 of the stationary rail 2. An unlocking frame 51 is mounted to slide in the vertical direction over the top portion 8a of the fin wall 8 of the moving rail via angle brackets 52 mounted on the fin wall 8. A control member 49, such as a cam, is mounted so that it can be pivoted by a user about an axis 53 passing through an opening provided in the moving rail. The unlocking frame 51 has an inside bottom face 51a facing a contact surface 50a on one of a plurality of locking fingers 50 adapted to be urged by a bias element 35 such as a compression spring having a first end in abutment against a guiding pattern 21, and a second end bearing against an activation face 50b of the locking finger 50. In a manner similar to FIG. 9, the locking fingers 50 can be guided in their vertical translation movement by protrusions 21. In the locked position shown in FIGS. 12a and 12b, the springs 35 urge the locking fingers 50 that can be so urged into a locked position in which a bottom end of the finger 50 is inserted into an opening 48 in the stationary rail. The locking fingers 50 that are not in register with openings 48 in the stationary rail 2 come into abutment against the web 4 of said stationary rail, the spring 35 then being compressed between the guiding pattern 21 and the activation face 50b of the locking finger. In the unlocked position (not shown), the control member 49 moves the unlocking frame 51 upwards. Said unlocking frame drives the locking fingers 50 that are in the locked position upwards, by contact between the inside bottom face 51a and the contact surface 50a of the locking finger in question, so that said locking fingers disengage from the openings 48. Longitudinal adjustment of the position of the moving rail 3 relative to the stationary rail 2 is then possible. When the control member 49 is released, certain locking fingers 50 re-lock, as shown in FIG. 12a, under drive from the spring 35.

What is claimed is:

1. A vehicle seat runner having a first runner element formed to receive a vehicle seat element, and a complementary runner element designed to be fastened to the vehicle;

said first runner element extending in a longitudinal direction, and in the form of a channel-section shape, and presenting first and second side portions, co-operating with the complementary runner element to enable the first runner element to slide relative to the complementary runner element in the longitudinal direction, said first and second side portions comprising respectively a first fin wall and a second fin wall, the fin walls being substantially parallel to each other, spaced apart in a transverse direction, connected together via a base wall, and extending vertically downwards from the base wall;

each fin wall having an outside face, and an inside face opposite from the outside face, the inside face of the first fin wall and the inside face of the second fin wall facing each other;

wherein said inside faces are also fixed to each other in at least one additional fixation region situated under the base wall; and wherein each fin wall extends at least between the base wall and the additional fixation region, each fin wall having at least one protuberance protruding from the inside face of the fin wall, a first protuberance on the first fin wall, and a second protuberance on the second fin wall facing each other, said first and second protuberances being welded together to form said additional fixation region.

2. A vehicle seat runner according to claim 1, in which the inside faces are fixed to each other at a plurality of additional fixation regions situated under the base wall, and spaced apart from one another in the longitudinal direction.

3. A vehicle seat runner according to claim 1, in which the inside faces are connected to each other at least one additional connection region extending longitudinally and situated under the base wall.

4. A vehicle seat runner according to claim 3, in which the inside faces are connected to each other at least one additional connection region extending longitudinally over the entire length of the first runner element, localized openings being provided in the additional connection region.

5. A vehicle seat runner according to claim 1, in which said protuberance is a stamped region of the fin wall.

6. A vehicle seat runner according to claim 1, in which an internal space is defined between the two fin walls; the base wall or one of the fin walls being provided with an access opening giving access to the internal space; an anchor member extending through the access opening, the anchor member presenting an insertion portion extending between said fin walls and fastened to at least one fin wall, and an anchor portion adapted to receive the vehicle seat element.

7. A runner according to claim 6, in which the insertion portion is fastened at said additional connection region.

8. A system comprising a vehicle seat element and a vehicle seat runner according to claim 6, in which the anchor portion is fastened to the vehicle seat element.

9. A vehicle seat runner according to claim 6, in which the anchor portion carries an anchor member for anchoring a seatbelt forming a portion of a system for restraining the occupant.

10. A vehicle seat runner according to claim 1, in which an internal space is defined between the two fin walls, and in which the channel-section shape has a guiding pattern adapted to guide a runner equipment mounted to move relative to the channel-section shape in the internal space.

11. A vehicle seat runner according to claim 10, further having a runner equipment mounted to move in translation relative to the channel-section shape by co-operation with the guiding pattern.

12. A vehicle seat runner according to claim 11, in which the equipment is a runner locking member mounted to move in translation relative to the channel-section shape between a locking position in which the locking member co-operates with the complementary runner element to prevent the first runner element from moving relative to the complementary runner element, and an unlocked position for allowing the first runner element to move relative to the complementary runner element; a bias element being adapted to urge the locking member towards the locked position; the runner further having a control member adapted to cause the locking member to move against the drive from the bias element, towards the unlocked position.

13. A motor vehicle seat runner according to claim 12, in which the locking member is a first locking member having at least one first latch surface adapted to co-operate with the complementary runner element in the locked position so as to prevent the first runner element from moving relative to the complementary runner element, the first locking member further having an activation surface; the runner further having a second locking member mounted to pivot relative to the channel-section shape between a locked position and an unlocked position, the second locking member having a second latch surface adapted to co-operate with the complementary runner element in the locked position, the second latch member having a driven surface; the first latch surface and the second latch surface being spaced apart from each other in the longitudinal direction; the activation surface facing the driven surface so as to cause the second locking member to move from its locked position towards its unlocked position when the first locking member is subjected to being moved from its locked position towards its unlocked position.

14. A vehicle seat runner according to claim 10, further having a runner equipment mounted to pivot relative to the channel-section shape by co-operation with the guiding pattern.

15. A vehicle seat runner according to claim 14, in which the guiding pattern comprises at least one first recess formed in the internal face of a first fin wall; in which the runner equipment has a protrusion coming in contact in the first recess and shaped to turn in the first recess while the equipment is moving relative to the channel-section shape.

16. A vehicle seat runner according to claim 15, in which the inside face of the second fin wall has a second recess facing the first recess, and in which the runner equipment has a third recess opposite from the protrusion, the runner having a ball held captive between the second and third recesses, and adapted to turn relative to the second fin wall and/or to the equipment while the equipment is pivoting relative to the channel-section shape.

17. A vehicle seat runner according to claim 16, in which the protrusion and the third recess opposite from the protrusion are formed by stamping the equipment.

18. A vehicle seat runner according to claim 15, in which said recesses in the fin walls are formed by punching.

19. A motor vehicle seat runner according to claim 14, in which the equipment is a runner locking member mounted to pivot relative to the channel-section shape between a locking position in which the locking member co-operates with the complementary runner element to prevent the first runner element from moving relative to the complementary runner element, and an unlocked position for allowing the first runner element to move relative to the complementary runner element; a bias element being adapted to urge the locking member towards the locked position; and the runner further having at least one control element adapted to cause the locking member to move, against the drive from the bias element, towards the unlocked position.

20. A vehicle seat runner according to claim 14, in which the equipment is a wheel having a rolling surface in contact with the complementary runner element, and adapted to being subjected to pivoting relative to the channel-section shape when the first runner element slides relative to the complementary runner element.

21. A vehicle seat runner having a first runner element formed to receive a vehicle seat element, and a complementary runner element designed to be fastened to the vehicle;

said first runner element extending in a longitudinal direction, and in the form of a channel-section shape, and presenting first and second side portions, co-operating with the complementary runner element to enable the first runner element to slide relative to the complementary runner element in the longitudinal direction, said first and second side portions comprising respectively a first fin wall and a second fin wall, the fin walls being substantially parallel to each other, spaced apart in a transverse direction, connected together via a base wall, and extending vertically downwards from the base wall;

each fin wall having an outside face, and an inside face opposite from the outside face, the inside face of the first fin wall and the inside face of the second fin wall facing each other;

wherein said inside faces are also connected to each other in at least one additional connection region situated under the base wall;

an internal space being defined between the two fin walls, the vehicle seat runner further having a runner equipment, the channel-section shape having a guiding pattern adapted to guide said runner equipment mounted to move in translation relative to the channel-section shape by co-operation with the guiding pattern;

the guiding pattern including at least one first protrusion protruding from the inside face of a first fin wall, and wherein the runner equipment has a contact surface coming in contact with the first protrusion and shaped to slide relative to the first protrusion while the equipment is moving relative to the channel-section shape.

22. A vehicle seat runner according to claim 21, in which the guiding pattern includes at least one second protrusion protruding from the inside face of the first fin wall, the first and second protrusions defining a direction of sliding for the equipment; in which the contact surface comes in contact with the second protrusion and is shaped to slide in the direction of sliding relative to the second protrusion, so as to enable the equipment to slide relative to the channel-section shape in the direction of sliding.

23. A vehicle seat runner according to claim 21, in which the guiding pattern has at least one third protrusion protruding from the inside face of the first fin wall, the first and third protrusions being disposed on either side of the equipment in the longitudinal direction; in which the contact surface comes in contact with the third protrusion and is shaped to slide relative to the third protrusion, so as to enable the equipment to slide between the first and third protrusions.

24. A vehicle seat runner according to claim 21, in which the guiding pattern has, for each protrusion provided on the first fm wall, a complementary facing protrusion protruding from the inside face of the second fin wall, the contact surface coming in contact with the complementary protrusion and being shaped to slide relative to the protrusion and to the complementary protrusion while the equipment is moving relative to the channel-section shape.

25. A vehicle seat runner according to claim 21, in which the protrusions are stamped zones of the first or of the second fin wall.

* * * * *